Patented Sept. 10, 1940

2,214,039

UNITED STATES PATENT OFFICE 2,214,039

METHOD FOR THE PREPARATION OF TERPENE DERIVATIVES

Joseph N. Borglin, Wilmington, Del., assignor to Hercules Powder Company, Wilmington, Del., a corporation of Delaware No Drawing. Application March 18, 1938, Serial No. 196,630

14 Claims. (Cl. 260—454)

This invention relates to a method for the preparation of terpene thiocyanates, and the corresponding terpene compounds of selenium and tellurium.

The method in accordance with this invention comprises reacting a compound having the type formula RXH, in which R is a terpene radical and X is sulfur, selenium or tellurium, with a suitable metal compound to produce a compound having the formula RXMe, in which Me is a metal, R is a terpene radical and X is sulfur, selenium or tellurium, and reacting this compound with a cyanogen halide to produce a compound having the type formula R—(CNX), in which R is a terpene radical and X is sulfur, selenium or tellurium. This terpene derivative is then separated from the by-products of the reaction and recovered in purified form.

The chemical reactions which take place in this method may be illustrated by the following equations:

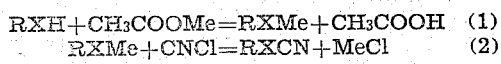

$$RXH + CH_3COOMe = RXMe + CH_3COOH \quad (1)$$
$$RXMe + CNCl = RXCN + MeCl \quad (2)$$

In these equations R represents a terpene group, X an element of the group consisting of sulfur, selenium and tellurium and Me a metal. The metal salt shown in Equation (1) is a metal acetate. This is intended only by way of illustration and not by way of limitation. I show the use of cyanogen chloride in the second equation. This is, similarly, only by way of illustration, since I may use any cyanogen halide in my method.

The terpene mercaptan which I may utilize as a starting material may be conveniently prepared by the direct addition of hydrogen sulfide to an unsaturated terpene compound such as, for example, an unsaturated terpene hydrocarbon as, pinene, dipentene, terpinene, terpinolene, camphene, menthene, fenchene, limonene, carene, etc., an unsaturated terpene alcohol as, alpha-terpineol, beta-terpineol, gamma-terpineol, etc., an unsaturated terpene ether, as, cineol, methylchavicol, terpinylmethyl ether, terpinylglycol ether, etc. by the method described in U. S. Patent 2,076,875 to Joseph N. Borglin and Emil Ott. It may likewise be prepared by the direct addition of hydrogen sulfide to the esters of the terpineols such as formate, acetate, etc. and their ethers. Similarly, it may be prepared by the direct addition of hydrogen sulfide to the various commercial terpene mixtures, such as, turpentine, pine oil, etc.

The corresponding derivative compounds of selenium and tellurium may, likewise, be prepared by the direct addition of hydrogen selenide and hydrogen telluride, respectively, to any of these unsaturated terpene compounds or mixtures.

In carrying out my method, the terpene mercaptan or the corresponding selenium or tellurium terpene derivative is converted to a mercaptide or the corresponding selenium or tellurium terpene derivative by contact with a metal compound, such as, for example, a metal salt, as, lead acetate, a copper acetate, a nickel acetate, mercuric acetate, silver acetate, etc., or a metal hydroxide, as, sodium hydroxide, potassium hydroxide, etc. which may and preferably will be dissolved in a suitable solvent such as, water, methanol, ethanol, acetone, etc. It is desirable to utilize a salt of a metal which gives an insoluble compound with the particular halide contained in the cyanogen halide which I use in the next stage of the reaction. The resulting terpene mercaptide, or corresponding terpene compound of selenium or tellurium, is then dissolved in a suitable organic solvent therefor, which is inert to a cyanogen halide. The resulting solution is treated with a cyanogen halide such as, for example, cyanogen chloride, cyanogen bromide, cyanogen iodide, etc. which may, if desired, likewise be dissolved in a suitable organic solvent. This treatment results in a reaction between the terpene mercaptide, or the corresponding terpene compound of selenium or tellurium, and the cyanogen halide, by which a terpene thiocyanate, a terpene selenocyanate, or a terpene tellurocyanate and a metal halide are formed. The terpene thiocyanate, or the terpene selenocyanate or terpene tellurocyanate, as the case may be, is then separated from the metal halide. When the reaction is carried out in a solution from which the metal halide precipitates, this may be conveniently done by filtering the precipitated metal halide from the solution and then recovering the terpene derivative by evaporating the volatile solvent.

This reaction may be carried out at a temperature within the range of about 0° C. to about 150° C. and I prefer to use a temperature within the range of about 20° C. to about 30° C. Thus, normal room temperature may be conveniently used for carrying out this invention.

The method in accordance with this invention is further illustrated by the following example:

*Example I*

A crude terpene mercaptan mixture containing 14% sulfur and prepared by the method described in U. S. Patent 2,076,875, was extracted with a solution composed of 70% alcohol, 10% sodium hydroxide and 20% water and the extract acidified to give a 74% yield of terpene mercaptan which contains 14.4% sulfur. Forty parts by weight of the extracted terpene mercaptan was converted to lead mercaptide by contacting it with an aqueous solution of lead acetate. An ether solution of the terpene lead mercaptide was then added to an ethyl alcohol solution of cyanogen bromide and lead bromide was precipitated. The filtered solution was then washed with water and the solvent evaporated to recover 36 parts by weight of a terpene thiocyanate which analyzed 15.2% sulfur, showing it to contain about 98% thiocyanate.

The compounds which I prepare by the method in accordance with this invention are valuable insecticides and are also useful as intermediates for the preparation of other terpene derivatives.

It will be understood that the details and examples given herein are by way of illustration and not by way of limitation of the composition as broadly described and claimed.

What I claim and desire to protect by Letters Patent is:

1. A method for the production of a terpene compound having the type formula R—(CNX) in which R is a terpene group and X is an element of the group consisting of sulfur, selenium, and tellurium and the —(CNX) group is linked directly to a carbon atom of the terpene group, which comprises reacting a compound of the type formula RXM in which R is a terpene group, X is an element of the group consisting of sulphur, selenium and tellurium, and M is a metal, with a cyanogen halide.

2. A method for the production of a terpene thiocyanate, which comprises reacting a terpene mercaptide with a cyanogen halide.

3. A method for the production of a terpene thiocyanate, which comprises reacting a terpene hydrocarbon mercaptide with a cyanogen halide.

4. A method for the production of a terpene thiocyanate, which comprises reacting a terpene alcohol mercaptide with a cyanogen halide.

5. A method for the production of a terpene thiocyanate, which comprises reacting a terpene ether mercaptide with a cyanogen halide.

6. A method for the production of a terpene thiocyanate, which comprises reacting a pinene mercaptide with a cyanogen halide.

7. A method for the production of a terpene thiocyanate, which comprises reacting a terpineol mercaptide with a cyanogen halide.

8. A method for the production of a terpene thiocyanate, which comprises reacting a glycolterpinyl ether mercaptide with a cyanogen halide.

9. A method for the production of a terpene thiocyanate, which comprises reacting a terpene lead mercaptide with a cyanogen halide.

10. A method for the production of a terpene thiocyanate, which comprises reacting a terpene mercaptan with a metal acetate to produce a terpene mercaptide and reacting the terpene mercaptide with a cyanogen halide.

11. A method for the production of a terpene thiocyanate, which comprises reacting a terpene mercaptan with lead acetate to produce a terpene lead mercaptide and reacting the terpene lead mercaptide with cyanogen bromide.

12. A method for the production of a terpene thiocyanate, which comprises reacting a terpene mercaptan with copper acetate to produce a terpene copper mercaptide and reacting the terpene copper mercaptide with a cyanogen halide.

13. A method for the production of a terpene thiocyanate, which comprises reacting a terpene mercaptan with an alkali metal hydroxide to produce a terpene mercaptide and reacting the terpene mercaptide with a cyanogen halide.

14. A method for the production of a terpene thiocyanate, which comprises reacting a terpene mercaptan with sodium hydroxide to produce a terpene sodium mercaptide and reacting the terpene sodium mercaptide with a cyanogen halide.

JOSEPH N. BORGLIN.